United States Patent [19]
Murano et al.

[11] Patent Number: 5,197,806
[45] Date of Patent: Mar. 30, 1993

[54] BEARING SYSTEM

[75] Inventors: Kanji Murano, Tokyo; Tetsuo Sekiya, Kanagawa; Akihiko Ohashi, Shizuoka; Takehisa Ishida, Tokyo, all of Japan

[73] Assignee: Sony Corporation, Tokyo, Japan

[21] Appl. No.: 849,535

[22] Filed: Mar. 11, 1992

Related U.S. Application Data

[62] Division of Ser. No. 587,041, Sep. 24, 1990.

[30] Foreign Application Priority Data

Sep. 25, 1989 [JP] Japan .................................. 1-249507

[51] Int. Cl.⁵ ........................................... F16C 32/00
[52] U.S. Cl. ........................................ 384/1; 384/490
[58] Field of Search .................. 384/1, 490, 548, 445, 384/456

[56] References Cited

U.S. PATENT DOCUMENTS

| | | | |
|---|---|---|---|
| 3,304,132 | 2/1967 | Broeze et al. | 384/1 |
| 3,501,204 | 3/1970 | Schreffler | 384/490 |
| 4,630,941 | 12/1986 | Chainer et al. | 384/1 |
| 4,971,455 | 11/1990 | Kawakami et al. | 384/1 |

Primary Examiner—Lenard A. Footland
Attorney, Agent, or Firm—Lewis H. Eslinger; Donald S. Dowden

[57] ABSTRACT

Described herein is a rotational bearing system incorporating a ball bearing to support a shaft or housing in freely rotatable state through rolling contact with the ball bearing, the rotational bearing system comprising: vibratory elements adapted to excite in resonant vibration a fixed shaft or a fixed housing in rolling contact with the ball bearings thereby to lower the frictional resistance of the ball bearing.

3 Claims, 9 Drawing Sheets

INTERNALLY EXCITED

FIG. 8B 
NO INTERNAL EXCITATION

FIG. 9A

FIG. 9B 
INTERNALLY EXCITED

FIG. 12A

FIG. 12B 
NO EXTERNAL EXCITATION

FIG. 13A

FIG. 13B 
EXTERNALLY EXCITED

PRIOR ART

BEARING SYSTEM

This is a division of application Ser. No. 07/587,041, filed Sep. 24, 1990.

BACKGROUND OF THE INVENTION

1. Field of the Invention

This invention relates to a rotational bearing system which is suitably applicable, for example, to a hard disk head access mechanism or the like.

More specifically, this invention concerns a rotational bearing system with a ball bearing for rotatably supporting a shaft or a housing, the bearing system including means to excite a shaft or a housing, whichever is on the stationary side, in vibration to reduce the frictional resistance of the bearing to a marked degree.

2. Description of the Prior Art

Figure 18:
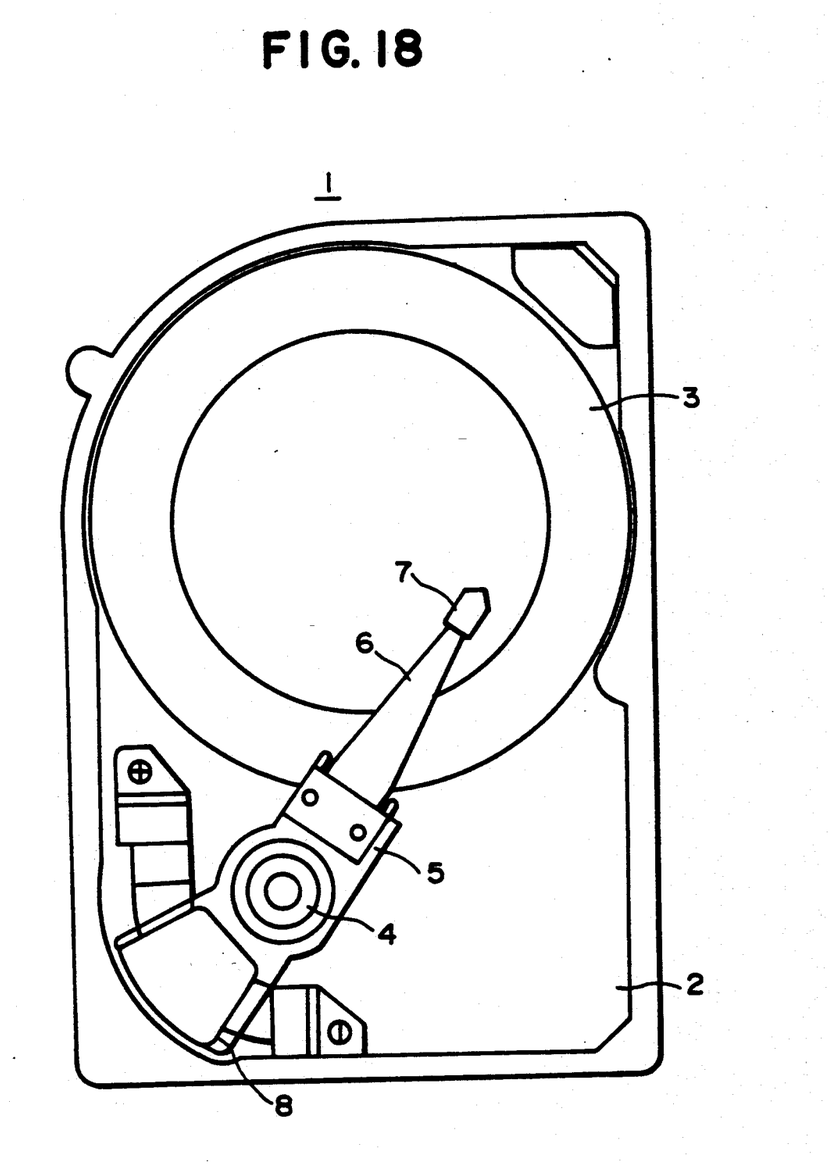
FIG. 18 is a schematic plan view of a hard disk head access mechanism.

Shown in FIG. 18 is the construction of a head access mechanism in a conventional hard disk device, including a swing arm 5 rotatably mounted on an arm bearing assembly 4 for rotational movements relative to a magnetic memory medium or a hard disk 3 mounted on a base 2. A magnetic head 7 is mounted on the fore distal end of the swing arm 5 through a head suspension 6.

A voice coil motor 8 is mounted on the rear end of the swing arm 5 away from the magnetic head 7. The swing arm 5 is rotationally driven according to a tracking control signal which is supplied to the voice oil motor 8, moving the magnetic head 7 across the recording tracks formed on the magnetic memory medium 3, for making an access or for a tracking action.

Figure 19:
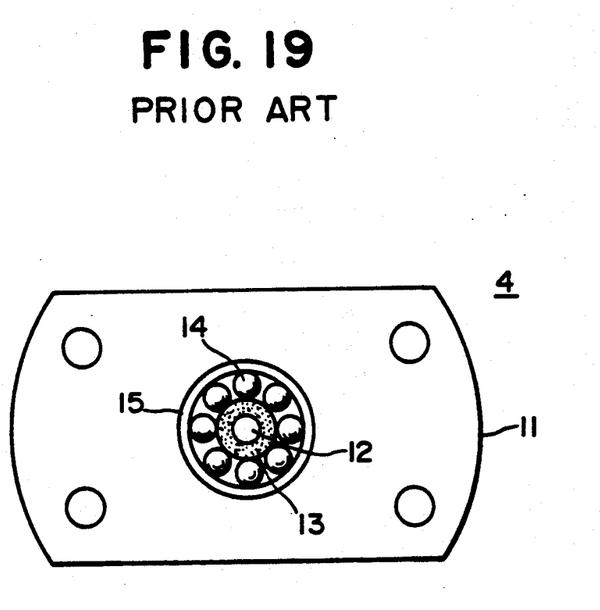
FIG. 19 is a schematic plan view of a conventional bearing system.

As shown in FIG. 19, the arm bearing 4 has its housing 15 rotatably supported on a fixed shaft 13 which is planted on a base member 14 by means of a fitting screw 12, through ball bearings 14 which are arranged around the fixed shaft 13. The swing arm 5 is fixedly mounted, for example, on the upper end of the housing 15.

With the hard disk head access mechanism of the above-described construction, in case the track pitch between the respective recording tracks on the magnetic memory medium 3 is minimized to increase the recording density, as a matter of fact the accuracy of controlling the position of the magnetic head 7 has to be extended to a range of fine movements of the order of submicrons.

For fine and high-speed control of the position of the magnetic head 7, it is important to reduce the frictional resistance of the ball bearings 14 of the arm bearing 4. For instance, if the ball bearings 14 have a large frictional resistance, correct tracking control of the magnetic head 7 becomes difficult due to lack of linearity between the tracking servo signal which is supplied to the voice oil motor 8 for a fine displacement of the magnetic head 7 and the actual magnetic head displacement.

SUMMARY OF THE INVENTION

In view of the foregoing situations, the present invention has as its object the provision of a rotational bearing system of the type employing ball bearings for supporting a rotational shaft or a rotatable housing and which is arranged to reduce the frictional resistance of the bearing markedly to realize high-speed servo characteristics.

In accordance with the present invention, there is provided a rotational bearing system incorporating a ball bearing to support a shaft or housing in freely rotatable state through rolling contact with the ball bearing, the rotational bearing system comprising: vibratory elements adapted to excite in resonant vibration a fixed shaft or a fixed housing in rolling contact with the ball bearings thereby to lower the frictional resistance of the ball bearing.

By exciting in a predetermined resonance mode a fixed shaft or a fixed housing, which forms a stationary member in rolling contact with the ball bearings, the frictional resistance of the bearing relative to the rotatable housing or rotational shaft can be lowered to a marked degree, permitting accurate control of fine movements of an object of control with satisfactory linearity.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Hereafter, the invention is described more particularly by way of the preferred embodimemts shown in the drawings.

Referring to FIGS. 1 through 4, there is shown a first embodiment incorporating the invention into an internally excited type bearing system, wherein the component parts common to the conventional counterpart of FIG. 18 are designated by common reference numerals. In this embodiment, the arm bearing 4 assembly which rotatably supports the swing arm 5 on the base 2 includes a fixed shaft 21 which is fixed on the base 2, and a rotatable housing 23 which is rotatably mounted on the fixed shaft 21 through ball bearings 22H and 22L which are provided at the upper and lower ends of the fixed shaft 21.

Figure 1:
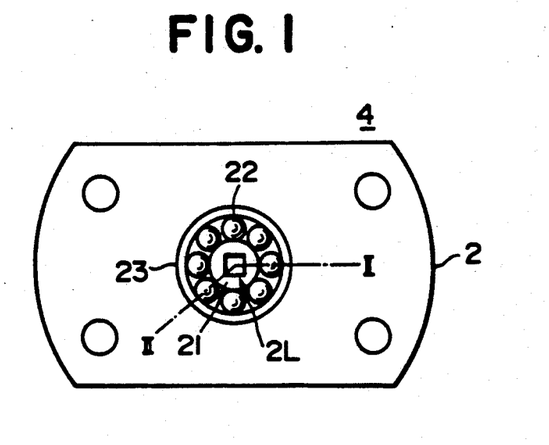
FIG. 1 is a schematic plan view of a bearing system embodying the present invention.
Figure 2:
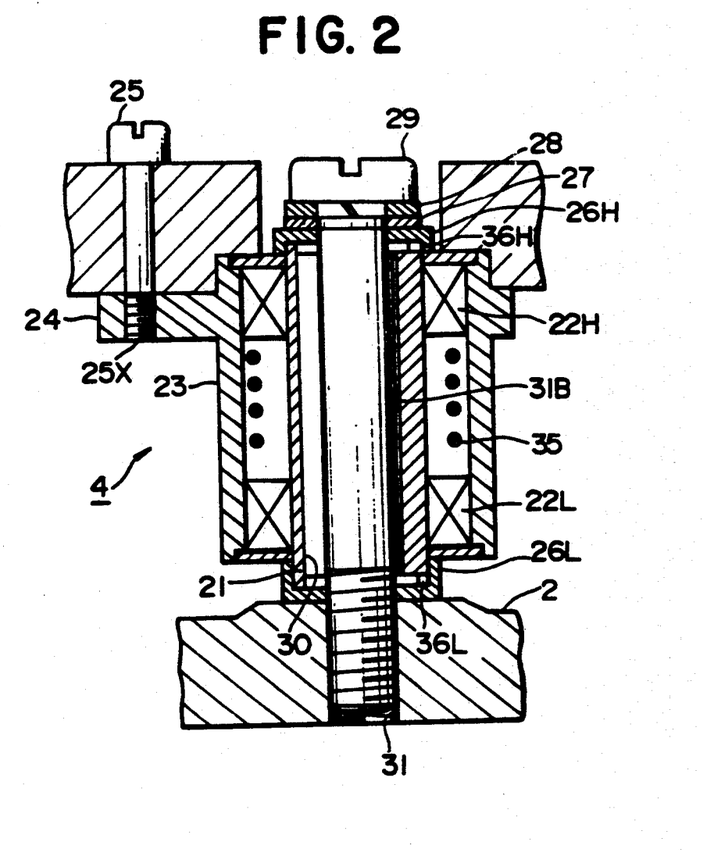
FIG. 2 is a sectional view of an arm bearing assembly, taken on line II—II of FIG. 1.

In this embodiment, the swing arm 5 is fixedly mounted by screws 25 on a flange portion 24 which is extended outward from the upper end of the rotatable housing 23.

The fixed shaft 21 is fixedly planted on the base 2 by threading a screw 29 into a tapped hole 31 in the base 2 through a bore 30 in the fixed shaft 21, interposing a pair of spacers 26H and 26L in abutting engagement with the upper and lower end faces of the fixed shaft 21, respectively, and a ring washer 27 and a spring washer 28 under the screw head.

Figure 3:
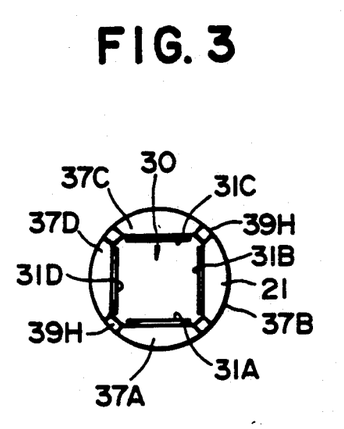
FIGS. 3 and 4 are a plan view and a perspective view, respectively, of the fixed shaft shown in FIG. 2.

As shown in FIG. 3, the fixed shaft 21 is formed with an axial center bore 30 substantially of a square shape in section, and has piezoelectric members 31A to 31D bonded on the inner surfaces of the four side walls of the bore 30, for example, by the use of an epoxy adhesive.

Figure 5:
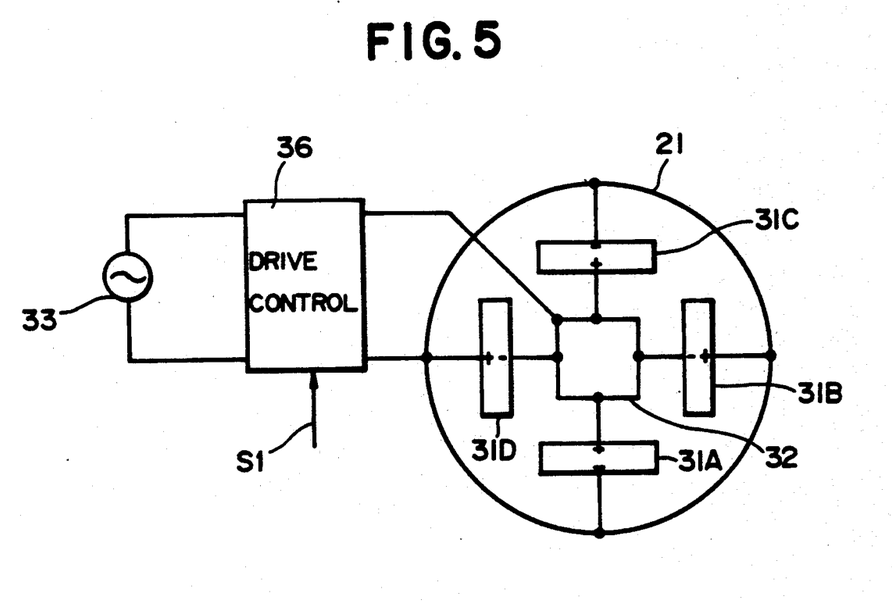
FIG. 5 is a diagrammatic illustration of a drive circuit for piezoelectric members.

The piezoelectric members 31A to 31D are each constituted by a strip-like piezoelectric material with a silver electrode bonded on each side by a baking treatment, and are inversely polarized relative to the adjacent piezoelectric members as shown in FIG. 5.

The outer silver electrode surfaces of the piezoelectric members 31A to 31D are bonded to the inner wall surface of the fixed shaft 21 by an epoxy adhesive to form equivalent circuits (FIG. 5) which are electrically commonly connected to the fixed shaft 21.

The silver electrodes on the inner side of the piezoelectric members 31A to 31D are commonly connected to a lead wire 32. The oscillating output of a resonance drive power source 33 (e.g., of a frequency of 90 kHz) is supplied between the lead wire 32 and the fixed shaft 21 through a drive control circuit 36 (controlled by drive control signal S1 applied from a system control circuit (not shown)), thereby putting the piezoelectric members 31A to 31D in an electrostrictive action repeatedly at the resonance frequency.

In this particular embodiment, a spring 35 which is interposed between the ball bearings 22H and 22L permits the latter to deviate in the upward and downward directions upon imposition of pressure, thereby suppressing the so-called "fluttering" of the ball bearings 22H and 22L.

Figure 6:
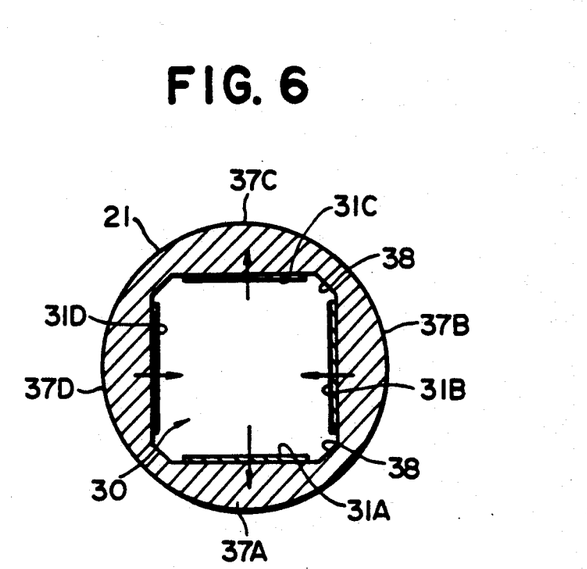
FIGS. 6 and 7 are sectional views of the fixed shaft, employed for explanation of a resonant excitation mode of the fixed shaft.

With the foregoing construction, as the piezoelectric members 31A to 31D are driven at a high frequency by the oscillating output of the resonance drive power source 33, each pair of the opposingly located piezoelectric members (31A and 31C, and 31B and 31D) which are polarized in the opposite directions (in the outward or inward direction) are put in electrostrictive actions in these directions. As a result, the wall surfaces 37A to 37D which are bonded respectively to the piezoelectric members 31A to 31D are excited in resonant state generating standing waves of double wavelength with a node at junction points 38.

Figure 7:
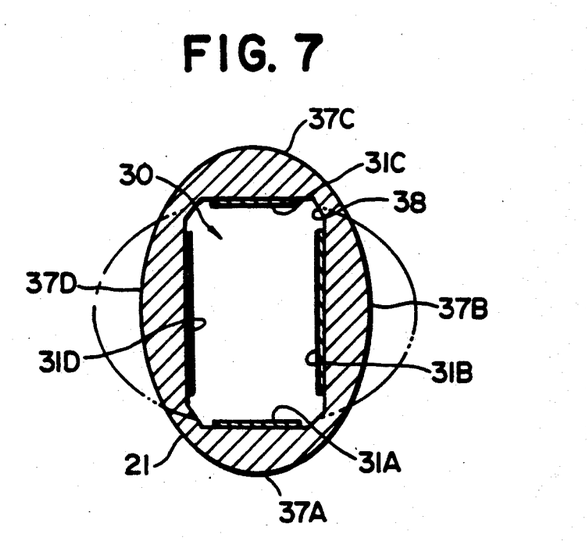

In such a state of resonant excitation, as shown schematically in FIG. 7, the fixed shaft 21 can be put in resonant vibrations having alternately a first deformation mode indicated by solid line where the it tends to expand in the direction of a pair of opposing piezoelectric members 31A and 31C, and a second deformation mode indicated by chain line where it tends to expand in the direction of the other pair of piezoelectric members 31B and 31D.

If a tracking servo signal is supplied to the voice coil motor 8 while vibrating the arm bearing assembly 4 in such vibration modes, the frictional resistance of the ball bearings 22H and 22L relative to the swing arm 5 is reduced markedly, permitting to improve the linearity of fine movements of the swing arm 5 and thus of the magnetic head 7 relative to the tracking servo signal to a significant degree, as compared with the conventional counterpart.

According to the results of experiments, the resonance frequency of the fixed shaft 21 was 86 kHz in a case employing, as the fixed shaft 21, a 6 mm (diameter)×15 mm (length) metal cylinder internally formed with the bore 30 and having 2.7 mm×15 mm×0.2 mm piezoelectric members 31A to 31D bonded on the inner wall surfaces thereof.

It has also been confirmed that, as a driving force is applied by the voice coil motor 8 for a fine drive of the swing arm 5 which is supported on the arm bearing assembly 4 with the fixed shaft 21, the frictional resistance can be lowered by the resonant excitation of the fixed shaft 21 conspicuously as compared with operations without the resonant excitation.

Figure 8A:
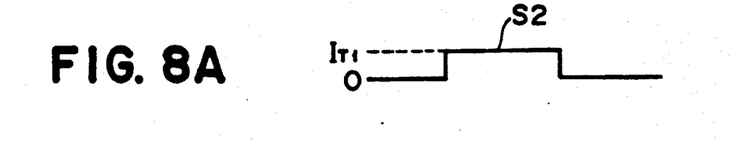
FIGS. 8A–B and 9A–B are signal waveform diagrams showing results of experiments.
Figure 8B:
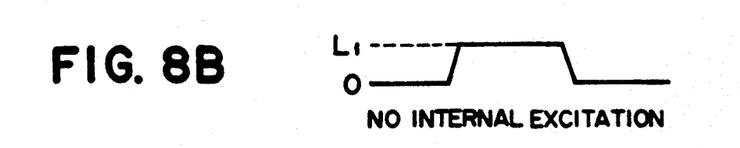
Figure 9A:
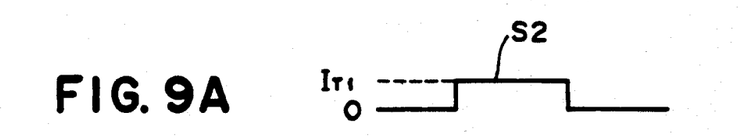
Figure 9B:
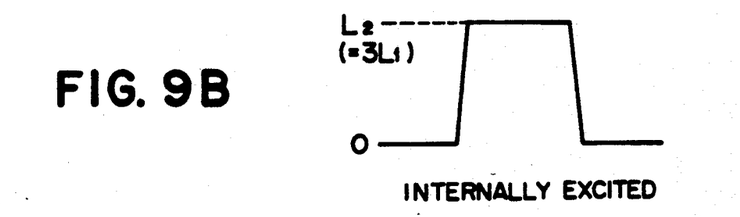

Namely, it has been confirmed that the magnetic head 7 is displaced by a distance $L_1$ as shown in FIG. 8(A) when a drive signal S2 in the form of a stepwise varying current $I_{T1}$ is applied to the voice oil motor 8 without the resonant excitation of the fixed shaft 21, while the magnetic head 7 is displaced by an about three times greater distance $L_2$ as shown in FIG. 9(A) when the same drive signal S2 of the stepwise varying current $I_{T1}$ is applied to put the fixed shaft 21 in resonant excitation.

This implies that the resonant excitation of the fixed shaft 21 by the internal excitation has an effect of reducing to about ⅓ the frictional resistance of the fixed shaft 21 and the rotatable housing 23 which are in rolling contact with the ball bearings 22H and 22L.

Figure 4:
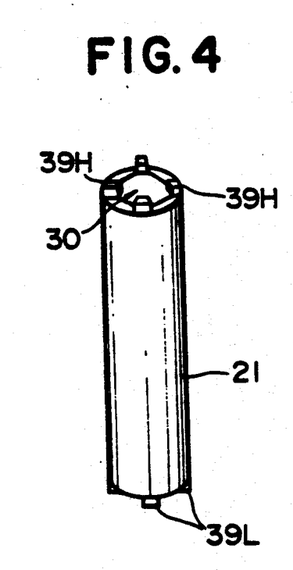

As seen particularly in FIGS. 2 to 4, the fixed shaft 21 is provided with four fulcrum projections 39H or 39L on the upper and lower end faces in positions corresponding to the nodes 32, thereby spacing apart the vibratory portions of the wall surfaces 37A to 37D from the spacers 26L or 26H, which would otherwise interfere with the resonant actions of the wall portions 37A to 37D.

Figure 10:
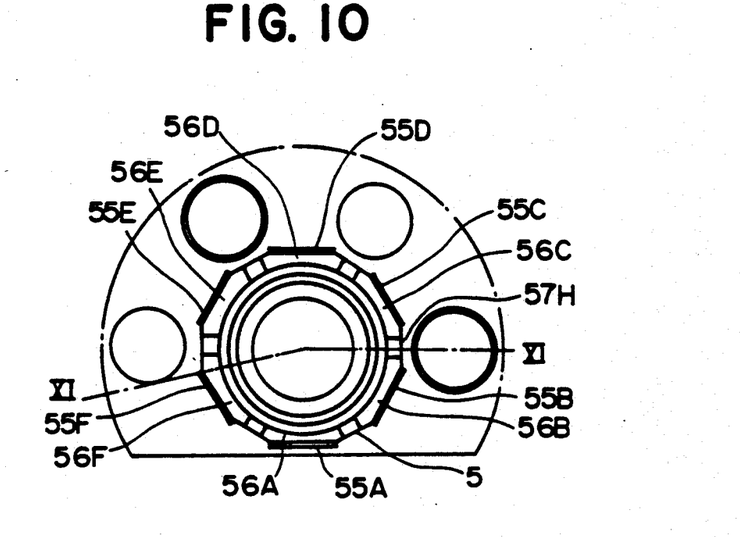
FIG. 10 is a view similar to FIG. 1 but showing another embodiment of the rotational bearing system according to the present invention.
Figure 11:
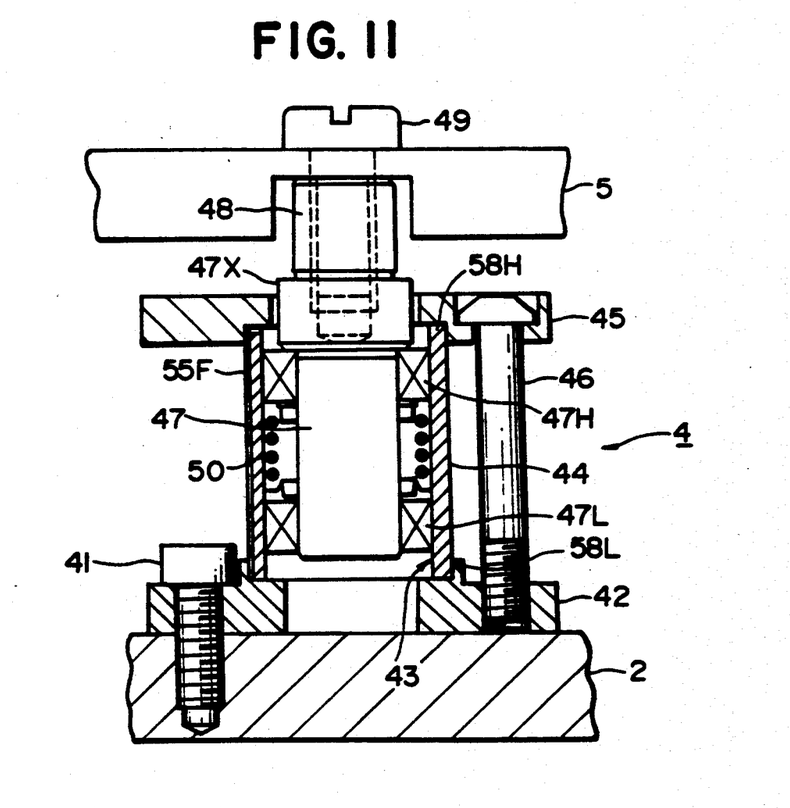
FIG. 11 is a sectional view of the bearing system, taken on line XI—XI of FIG. 10.

Referring to FIGS. 10 and 11, there is shown a second embodiment in which the invention is applied to an externally excited type bearing system and wherein the component parts common to FIG. 18 are designated by common reference numerals. In this embodiment, the arm bearing assembly 4 is arranged to drive a swing arm 5 by a rotational shaft which is rotatable relative to the base 2.

More specifically, a hexagonal fixed housing 44 with a bore 43 of a circular shape in section is erected on a base member 42 which is fixed on the base 2 by set screws 41. The upper end of the housing 44 is fixed in position by means of a stationary member 45 which is fixed to the base 2 by set screws 46.

Received in the bore 43 of the fixed housing 44 is a rotational shaft 47 which is rotatably supported by ball bearings 47H and 47L at the upper and lower ends of the bore 43. The swing arm 5 is integrally fixed to outwardly projected end 47X of the rotational shaft 47 by a set screw 49 through a spacer 48. Indicated at 50 is a spring which is interposed between the ball bearings 47H and 47L.

Piezoelectric members 55A to 55F are bonded on outer surfaces of the six side walls of the fixed housing 44 thereby to excite the wall surface portions 56A to 56F in resonance.

In this case, the adjacent piezoelectric members 55A and 55B, 55B and 55C, 55C and 55D, 55D and 55E, 55E and 55F and 55F and 55A are polarized inversely to each other by a polarization treatment to excite the fixed housing 44 in resonance in a mode in which standing or stationary waves of triple wavelength are generated in the wall surface portions 56A to 56F with a node at junctions 57 between the adjacent piezoelectric members.

With the arrangement of FIGS. 10 and 11, the frictional force of the ball bearings 47H and 47L which are inserted between the fixed housing 44 and rotational shaft 47 can be reduced in the same manner as in the first embodiment of FIGS. 1 through 9, except that the resonant excitation is induced from outside of the fixed housing 44. It follows that the frictional resistance of the bearings can be lowered markedly as compared with the conventional counterpart.

In this embodiment, similarly six fulcrum projections 58H or 58L are provided on the upper and lower end faces of the fixed housing 44 in positions corresponding to the nodes 56. These fulcrum projections 58H and 58L are abutted against the stationary member 45 and base member 42, spacing the wall surface portions 56A to 56F from the stationary member 45 and base member 42 to excite the wall surface portions 56A to 56F efficiently in resonance free of interference by the stationary and base members 45 and 42.

Figure 12A:
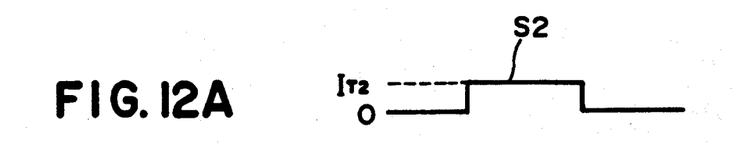
FIGS. 12A–B and 13A–B are signal waveform diagrams showing results of experiments.
Figure 12B:
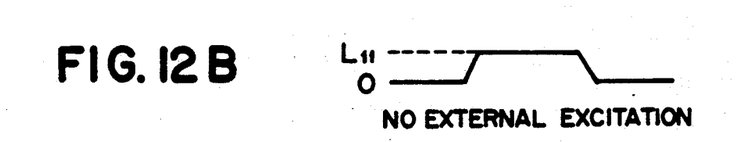
Figure 13A:
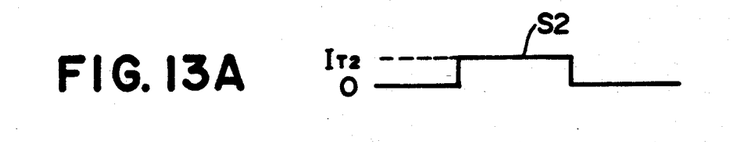
Figure 13B:
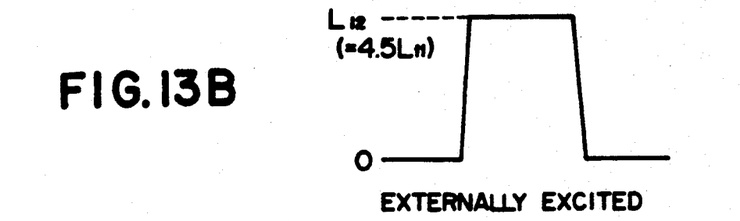

According to the results of experiments, in case of a hard disk device 1 employing the arm bearing assembly 4 with a fixed housing 44 of a resonance frequency of 64 kHz, the magnetic head 7 showed a response action as shown in FIG. 12(B), namely, a displacement by a distance $L_{11}$ when a drive signal S2 with a drive current value of $I_{72}$ was supplied to the voice coil motor 8 as shown in FIG. 12(A) without external resonant excitation by the piezoelectric members 55A to 55F on the fixed housing 44. In contrast, when the same drive signal S2 with a drive current value of $I_{72}$ was supplied to the voice coil motor 8 as shown in FIG. 13(A) with resonant excitation of the piezoelectric members 55A to 55F on the fixed housing 44, the distance of displacement $L_{12}$ of the magnetic head 7 became about 4.5 times greater than the distance $L_{11}$ in an unexcited state, as shown in FIG. 13(B).

The above-described embodiments of the invention are open to various modifications and alterations as follows.

(1) In the first embodiment shown in FIGS. 1 to 4, the fixed shaft 21 is shown as having a bore of a substantially equilateral square shape in section. However, it may be replaced by a bore of a substantially equilateral hexagonal shape as shown in FIG. 14 or of other polygonal shape with a larger number of angles.

Figure 14:
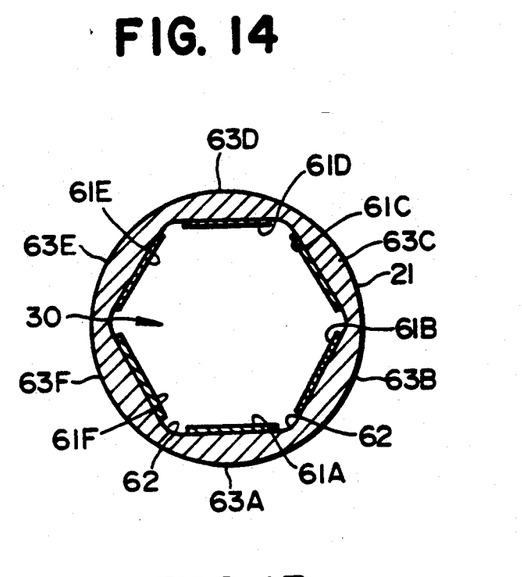
FIGS. 14 and 15 are sectional views of a modification of the fixed shaft for an internally excited type bearing system.

In the embodiment of FIG. 14, six piezoelectric members 61A to 61F are bonded on the six surfaces 61A to 61F of the hexagonal side walls to excite the wall surface portions 61A to 61F in resonant state generating stationary waves of a triple wavelength with nodes at the junctions 62 between the respective adjacent piezoelectric members.

The arrangement of FIG. 14 produces the same effects as described hereinbefore in connection with the embodiment of FIGS. 1 to 4.

Figure 15:
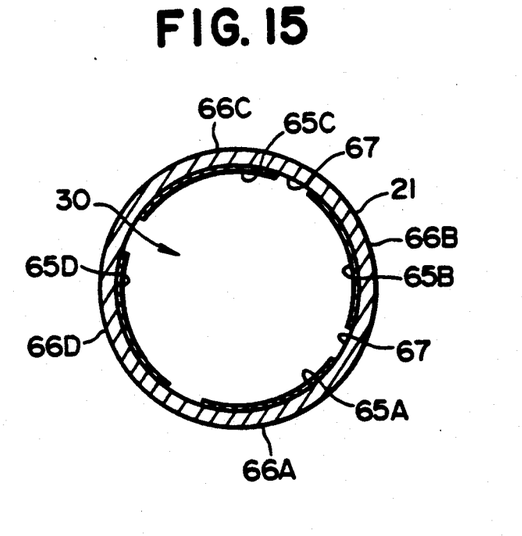

(2) In place of the square bore 30 of FIGS. 1 to 4, the fixed shaft 21 may be provided with a circular bore as shown in FIG. 15. In this case, four piezoelectric members 65A to 65D are mounted on the circular inner wall surface symmetrically in 90° angular positions such that each piezoelectric member faces another piezoelectric member, to excite the wall surface portions 66A to 66D in resonance generating standing waves of double wavelength with nodes at the joints 67 between the respective adjacent piezoelectric members.

The arrangement of FIG. 15 can also produce the same effects as the embodiment of FIGS. 1 to 4.

Figure 16:
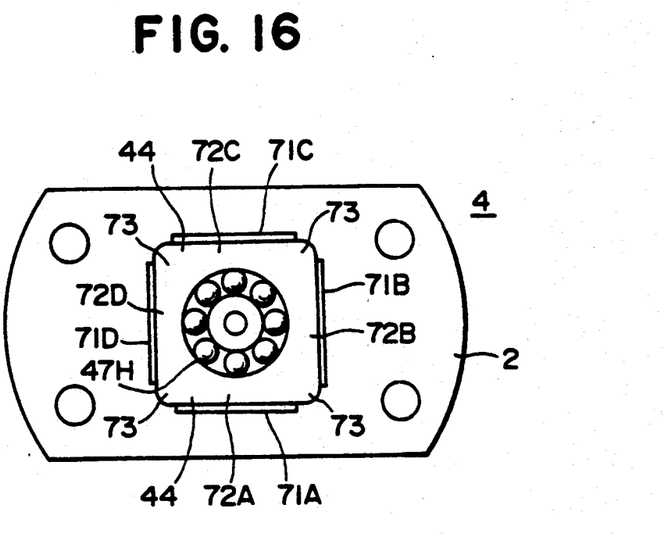
FIG. 16 is a diagrammatic plan view of a modification of the externally excited type bearing system.

(3) If desired, the fixed housing 44 of FIGS. 10 and 11 with a substantially equilateral hexagonal outer shape may be replaced by a housing of a square shape as shown in FIG. 16 or of other outer shapes. In case of the square housing of FIG. 16, four piezoelectric members 71A to 71D are bonded on the surfaces of the four side walls thereby to excite the contacting wall surface portions 72A to 72D in resonance generating standing waves of double wavelength having a node at the junctions between the respective adjacent piezoelectric members.

The arrangement of FIG. 16 likewise produces the same effects as described hereinbefore in connection with FIGS. 10 and 11.

Figure 17:
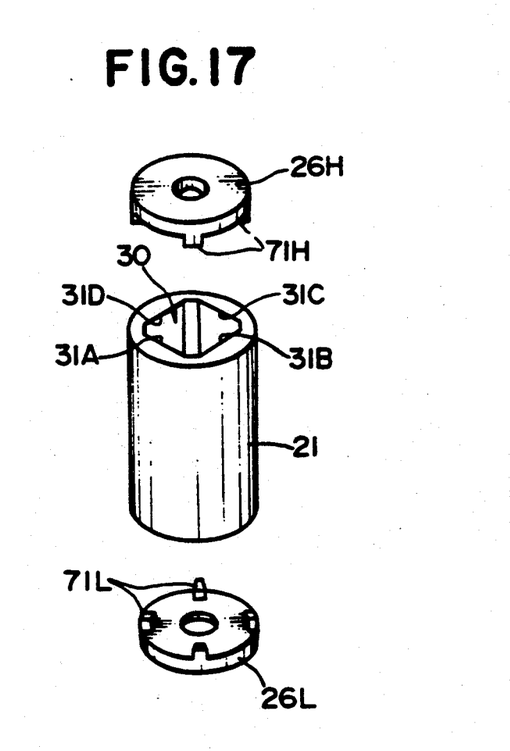
FIG. 17 is an exploded perspective view of a modification of fulcrum projections.

(4) In the embodiment of FIGS. 1 to 4, the fulcrum projections 39H and 39L are provided on the upper and lower end faces of the fixed shaft 21 in the positions corresponding to the nodes 38. Alternatively, the same effects can be obtained by providing the fulcrum projections 71H and 71L on the surfaces of the spacers 26H and 26L which are in abutting engagement with the upper and lower end faces of the fixed shaft 21 as shown in FIG. 17, instead of providing them on the fixed shaft 21.

With regard to the alternative location of the fulcrum projections, the same applies to the fulcrum projections 58H and 58L for the fixed housing 44 of FIGS. 10 and 11 to be excited in resonance. Namely, instead of providing the fulcrum projections 58H and 58L on the fixed housing 44, they may be provided on the part of the stationary member 45 and base member 42 to be held in abutting engagement with the upper and lower end faces of the fixed housing 44.

(5) Although the present invention is applied to a bearing system for a hard disk magnetic head access mechanism in the foregoing embodiments, the invention is applicable to ball bearing type rotational bearings in general.

(6) In the foregoing embodiments, the fixed shaft 21 or the fixed housing 44 is excited into resonance regardless of start and stop of the rotational drive of the swing arm 5. However, if necessary, the excitation may be controlled to cease when the swing arm 5 is at rest.

(7) There may be employed vibratory elements other than the piezoelectric members of the above-described embodiments.

(8) Irrespective of the particular number of the piezoelectric members used in the foregoing embodiments, similar effects of resonance can be obtained by the use of one or more piezoelectric members.

(9) Although the resonant excitation is a method of high power efficiency in driving the vibratory elements, the effects of the invention can be produced by excitation other than the resonant mode.

It will be appreciated from the foregoing description that, according to the present invention, a ball bearing type rotational bearing system with a markedly reduced frictional resistance can be realized by exciting in resonance a shaft or housing which constitutes a stationary member in rolling contact with the ball bearing.

What is claimed is:

1. A rotational bearing system incorporating a ball bearing to support for relative rotation a shaft and a housing through rolling contact with said ball bearing, said shaft being fixed, said bearing system comprising:

a plurality of vibratory elements for exciting in resonance the housing in contact with said ball bearing to lower the frictional rolling resistance of said ball bearing;

wherein said fixed shaft is formed with a bore extending axially therethrough, and said vibratory elements are mounted on inner wall surfaces of said bore of said fixed shaft, thereby creating nodes of resonant vibration of said inner wall surfaces.

2. A rotational bearing system as defined in claim 1, wherein said fixed shaft is fixed on a base by a screw through spacers inserted in abutting engagement with upper and lower ends of said fixed shaft, and is provided with fulcrum projections on the faces of said upper and lower ends in positions corresponding to said nodes of resonant vibration.

3. A rotational bearing system as defined in claim 1 or 2, wherein said bore has a polygonal shape in cross-section, and at least one of said vibratory elements is mounted on each facet of the polygonal-shaped inner wall surfaces of said fixed shaft.

* * * * *